United States Patent
Bruchmann

(10) Patent No.: US 7,176,271 B2
(45) Date of Patent: Feb. 13, 2007

(54) METHOD FOR THE PRODUCTION OF HIGHLY FUNCTIONAL, HIGHLY BRANCHED POLYUREAS

(75) Inventor: Bernd Bruchmann, Freinsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 232 days.

(21) Appl. No.: 10/503,366

(22) PCT Filed: Jan. 30, 2003

(86) PCT No.: PCT/EP03/00925

§ 371 (c)(1),
(2), (4) Date: Aug. 4, 2004

(87) PCT Pub. No.: WO03/066702

PCT Pub. Date: Aug. 14, 2003

(65) Prior Publication Data

US 2005/0222360 A1 Oct. 6, 2005

(30) Foreign Application Priority Data

Feb. 6, 2002 (DE) ................. 102 04 979

(51) Int. Cl.
*C08G 18/80* (2006.01)
(52) U.S. Cl. .................. 528/45; 528/68; 560/25; 564/34; 252/182.2
(58) Field of Classification Search .................. 528/45, 528/68; 560/25; 564/34; 252/182.2
See application file for complete search history.

(56) References Cited

U.S. PATENT DOCUMENTS 3,639,338 A * 2/1972 Kuder .................. 528/60
4,761,465 A * 8/1988 Speranza et al. ............. 528/45
6,376,637 B1 4/2002 Bruchmann et al.
6,632,914 B2 10/2003 Bruchmann et al.
2001/0005738 A1 6/2001 Bruchmann et al.

FOREIGN PATENT DOCUMENTS

| DE | 100 30 869 | 1/2002 |
|---|---|---|
| EP | 1 026 185 | 8/2000 |
| EP | 1 167 413 | 1/2002 |
| WO | 98/50453 | 11/1998 |
| WO | 98/52995 | 11/1998 |

OTHER PUBLICATIONS

Szycher; Polyurethanes; 1999; p. 4-16.*
Anil Kumar, et al., "Novel hyperbranched polymer based on urea linkages", Chem. Commun., pp. 1629-1630 1998.
Anil Kumar, et al., "Dendritic and hyperbranched polymers based on urea linkages", Polymer Preprints, vol. 39, No. 2, pp. 619-620 Jul. 16, 1998.
Ashootosh V. Ambade, et al., "An efficient route for the synthesis of hyper branched polymers and dendritic building blocks based on urea linkages", Journal of Polymer Science: Part A: Polymer Chemistry, vol. 39, pp. 1295-1304 Feb. 7, 2001.

* cited by examiner

*Primary Examiner*—Rachel Gorr
(74) *Attorney, Agent, or Firm*—Oblon, Spivak, McClelland, Maier & Neustadt, P.C.

(57) ABSTRACT

A process for preparing high-functionality, highly branched polyureas comprises the steps a) reaction of an at least bifunctional capped diisocyanate or polyisocyanate with at least one at least bifunctional primary and/or secondary amine with elimination of the capping agent, b) intramolecular reaction of the reaction product from step a) to form a high-functionality, highly branched polyurea.

10 Claims, No Drawings

METHOD FOR THE PRODUCTION OF HIGHLY FUNCTIONAL, HIGHLY BRANCHED POLYUREAS

The present invention relates to high-functionality, highly branched polyureas which are based on diisocyanates or polyisocyanates and diamines or polyamines and are built up in a targeted manner, and also a process for preparing them.

The high-functionality, highly branched polyureas of the present invention can advantageously be used, inter alia, as adhesion promoters, thixotropes or as building blocks for producing paints and varnishes, coatings, adhesives, sealants, castable elastomers or foams.

Polyureas are customarily obtained from the reaction of isocyanates with water or isocyanates with amines. However, the reaction is very exothermic and gives products which are not uniform and have a high degree of crosslinking. For this reason, polyureas are generally insoluble in known organic solvents, cf. Becker/Braun, Kunststoff-Handbuch, vol. 7, Polyurethane, Hanser-Verlag 1993.

High-functionality polymers which contain urea groups and are built up in a defined manner are likewise known.

WO 98/52995 describes dendritic, clearly defined polyurethane polyols which can be prepared using isocyanates having a primary NCO group and a tertiary NCO group and dialkanolamines by means of a shell-type polymerization (sequential polymerization of one generation after another). The synthesis produces urea urethanes but with a distinct preponderance of urethane groups in the molecule (ratio of urea groups to urethane groups=1:2).

EP-A-1 026 185 describes the preparation of highly branched and hyperbranched polyurethane polyols which are prepared without protective group techniques by targeted buildup by means of $AB_2$ and $AB_3$ structures with exploitation of intramolecular reactivity differences between the reactants. The reaction is stopped by addition of an excess of one of the two reactants. Here too, use is made of amino alcohols which likewise lead to a dominant proportion of urethane linking groups (ratio of urea groups to urethane groups=1:2 or 1:3).

DE-A-100 30 869 describes the preparation of polyfunctional polyisocyanate polyaddition products for which the isocyanate-reactive components are said to be amino alcohols and also diamines and triamines as urea formers. However, these amines are used in combination with alcohols, since the reaction of diisocyanate with diamine or triamine alone is difficult to control because of its exothermic nature.

High-functionality hyperbranched polyureas are described by A. Kumar and E. W. Meijer, Chem. Commun. 1629 (1998), and by the same authors in Polym. Prep. 39, (2), 619 (1998).

The products are prepared from 3,5-diaminobenzoic acid (1) which is converted in a plurality of reaction steps into the amine-blocked carboxylic acid azide (2). This is subsequently heated to eliminate nitrogen and form the polyurea. The products described are extremely difficult to dissolve.

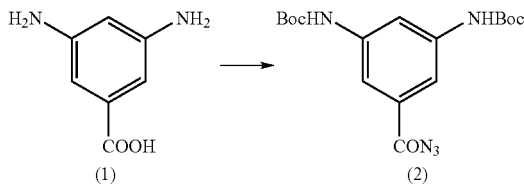

A recent publication by A. V. Ambade and A. Kumar, J. Polym. Sci. Part A, Polym. Chem. 39, 1295–1304 (2001), once again describes high-functionality hyperbranched polyureas which are prepared analogously from 3,5-diaminobenzoyl azide (2) or from 5-aminoisophthaloyl azide (3) via the azide route.

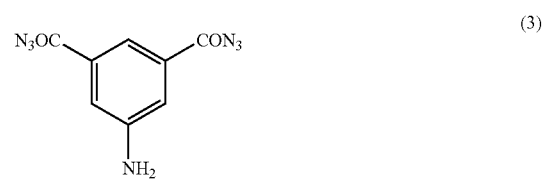

The products generated by this synthetic method, too, are described by the authors as insoluble in all customary solvents.

The azide route is also unattractive from an industrial point of view because of the following considerations:
- the multistage synthesis using protective group techniques increases production costs
- owing to the azide reactivity, only aromatic urea products can be prepared
- handling of aromatic carboxylic acid azides or aromatic amines on a large scale is associated with safety concerns.

High-functionality hyperbranched aliphatic polyureas can also be prepared as described in WO 98/50453. According to the process described there, triamines having two primary amine functions and one secondary amine function, e.g. dipropylenetriamine or trisaminoethylamine, are reacted with carbonyldiimidazole as phosgene-analogous compound. Imidazolides are formed initially and these then react further intramolecularly to form the polyureas. Disadvantages of the synthesis are the comparatively high price of carbonyldiimidazole and the fact that the resulting products always contain terminal imidazolide groups which are labile and have to be converted via a hydrolysis step into urea groups.

It is an object of the present invention to provide aliphatic and aromatic high-functionality, highly branched polyureas which can be prepared by means of a technically simple process and whose structures can easily be matched to the requirements of the application and which, owing to their defined structure, can combine advantageous properties such as high functionality, high reactivity and good solubility. Another object is to provide a process for preparing these high-functionality, highly branched polyureas.

We have found that this object is achieved by reacting diisocyanates or polyisocyanates having capped NCO groups with bifunctional or polyfunctional primary and/or secondary amines.

The present invention accordingly provides a process for preparing high-functionality polyureas, comprising the steps
a) reaction of an at least bifunctional capped diisocyanate or polyisocyanate with at least one at least bifunctional primary and/or secondary amine with elimination of the capping agent,
b) intermolecular reaction of the reaction product from step a) to form a high-functionality polyurea.

The invention further provides the high-functionality, highly branched polyureas prepared by this process.

The invention also provides for the use of the high-functionality, highly branched polyureas of the present invention as adhesion promoters, thixotropes or as building blocks for producing paints and varnishes, coatings, adhesives, sealants, castable elastomers or foams.

In a preferred embodiment of the process for preparing high-functionality, highly branched polyureas, diurethanes or polyurethanes are used as capped polyisocyanates; alcohols serve as capping agents here. The starting materials are thus diurethanes or polyurethanes which are reacted with at least one bifunctional or polyfunctional primary or secondary amine with elimination of a monoalcohol.

The corresponding diurethanes or polyurethanes can be prepared, for example, from the reaction of diisocyanates or polyisocyanates with aliphatic, araliphatic or aromatic alcohols, preferably monoalcohols. Furthermore, they can be prepared, for example, by reaction of primary amines with alcohol and urea as described in EP-A-18586, by reaction of primary amines with O-alkylcarbamates as described in EP 18588 or EP-A-28338, by reaction of primary amines with dimethyl carbonate as described in EP-A-570071 or by reaction of formamides with dimethyl carbonate or of primary amines with methyl formate as described in EP-A-609786.

In general, it is also possible to use diurethanes or polyurethanes which are used as starting materials or are formed as intermediates in the phosgene-free synthesis of diisocyanates or polyisocyanates as described in EP 355443, EP 566925, EP 568782 or DE 19820114.

In the reaction of the diurethanes or polyurethanes with the diamines or polyamines to form the high-functionality, highly branched polyureas of the present invention, the reversibility of the reaction between isocyanate and alcohol compared to the irreversibility of the reaction between isocyanate and amine under the given reaction conditions is exploited to obtain a controlled, targeted buildup of the molecule. Here, the alcohol is in principle utilized as capping agent for the isocyanate group, i.e. as moderator for the extreme reactivity of the isocyanate with the amine.

In a further embodiment of the process of the present invention, diisocyanates or polyisocyanates whose NCO groups have been capped by capping reagents as are described in the prior art are used as starting materials. These capping reagents achieve thermally reversible capping of the isocyanate groups at temperatures which are generally below 160° C. For this reason, capping agents used in thermally curable one-component polyurethane systems are used for the modification of isocyanates. These capping agents are comprehensively described, for example, in Z. W. Wicks, Prog. Org. Coat. 3 (1975) 73–99 and Prog. Org. Coat. 9 (1981), 3–28, D. A. Wicks and Z. W. Wicks, Prog. Org. Coat. 36 (1999), 148–172 and Prog. Org. Coat. 41 (2001), 1–83, and in Houben-Weyl, Methoden der Organischen Chemie, vol. XIV/2, 61 ff., Georg Thieme Verlag, Stuttgart 1963. As capping agents, preference is given to phenols, caprolactam, 1H-imidazole, 2-methylimidazole, 1,2,4-triazole, 3,5-dimethylpyrazole, dialkyl malonates, acetanilide, acetone oxime or butanone oxime.

Here too, the reaction with the diamine or polyamine to form the high-functionality, highly branched polyurea of the present invention occurs with elimination of the capping agent.

In the following, the NCO groups which have been protected by means of alcohols or capping agents are referred to as "capped NCO groups".

The high-functionality, highly branched polyureas formed by the process of the present invention are, after the reaction, i.e. without modification, terminated either by amino groups or by capped NCO groups. They dissolve readily in polar solvents, for example in alcohols such as methanol, ethanol, butanol, alcohol/water mixtures, dimethylformamide, dimethylacetamide, N-methylpyrrolidone, ethylene carbonate or propylene carbonate.

For the purposes of the present invention, a high-functionality polyurea is a product which contains urea groups and also at least three, preferably at least six, more preferably at least ten, functional groups. The maximum number of functional groups is not subject to any restrictions in principle, but products having a very large number of functional groups can have undesirable properties, for example high viscosity or poor solubility. The high-functionality polyureas of the present invention usually have not more than 100 functional groups, preferably not more than 50 functional groups.

The amines used in the preparation of the high-functionality, highly branched polyureas are selected from among compounds bearing at least two amine groups which are reactive toward urethane groups. Compounds having at least two amine groups which are reactive toward urethane groups are, for example, ethylenediamine, N-alkylethylenediamine, propylenediamine, 2,2-dimethyl-1,3-propanediamine, N-alkylpropylenediamine, butylenediamine, N-alkylbutylenediamine, hexamethylenediamine, N-alkylhexamethylenediamine, toluenediamine, diaminodiphenylmethane, diaminodicyclohexylmethane, phenylenediamine, cyclohexyldiamine, bis(aminophenyl)sulfone, isophoronediamine, 2-butyl-2-ethyl-1,5-pentamethylenediamine, 2,2,4- or 2,4,4-trimethyl-1,6-hexamethylenediamine, 2-aminopropylcyclohexylamine, 3(4)-aminomethyl-1-methylcyclohexylamine, 1,4-diamino-4-methylpentane, amine-terminated polyoxyalkylene polyols (known as Jeffamines), aminated polytetramethylene glycols, N-aminoalkylpiperidines, ammonia, bis(aminoethyl)amine, bis(aminopropyl)amine, bis(aminobutyl)amine, bis(aminopentyl)amine, bis(aminohexyl)amine, tris(aminoethyl)amine, tris(aminopropyl)amine, tris(aminohexyl)amine, trisaminohexane, 4-aminomethyl-1,8-octamethylenediamine, N'-(3-aminopropyl)-N,N-dimethyl-1,3-propanediamine, trisaminononane or melamine. It is also possible to use any mixtures of at least two of the compounds mentioned.

Possible diisocyanates or polyisocyanates are the aliphatic, cycloaliphatic, araliphatic and aromatic diisocyanates or polyisocyanates which are known from the prior art and are mentioned below by way of example. Preference is given here to diphenylmethane 4,4'-diisocyanate, mixtures of monomeric diphenylmethane diisocyanates and oligomeric diphenylmethane diisocyanates (polymeric MDI), tetramethylene diisocyanate, tetramethylene diisocyanate trimers, hexamethylene diisocyanate, hexamethylene diisocyanate trimers, isophorone diisocyanate trimers, methylenebis(cyclohexyl) 4,4'-diisocyanate, xylylene diisocyanate, tetramethylxylylene diisocyanate, dodecyl diisocyanate, lysine alkyl ester diisocyanate, where alkyl has from 1 to 10 carbon atoms, 1,4-diisocyanatocyclohexane or 4-isocyanatomethyloctamethylene 1,8-diisocyanate.

Diisocyanates or polyisocyanates which have NCO groups of differing reactivity are particularly preferred for producing the polyureas. Mention may here be made of tolylene 2,4-diisocyanate (2,4-TDI), diphenylmethane 2,4'-diisocyanate (2,4'-MDI), triisocyanatotoluene, isophorone diisocyanate (IPDI), 2-butyl-2-ethylpentamethylene diisocyanate, 2,2,4- or 2,4,4-trimethylhexamethylene 1,6-diisocyanate, 2-isocyanatopropylcyclohexyl isocyanate, 3(4)-isocyanatomethyl-1-methylcyclohexyl isocyanate, 1,4- diisocyanato-4-methylpentane, methylenebis(cyclohexyl) 2,4'-diisocyanate and 4-methylcyclohexane 1,3-diisocyanate (H-TDI).

Further isocyanates which are useful for producing the polyureas are isocyanates whose NCO groups initially have the same reactivity but in which initial addition of a reactant to an NCO group can induce a decrease in reactivity of the second NCO group. Examples are isocyanates whose NCO groups are coupled via a delocalized π electron system, e.g. phenylene 1,3- and 1,4-diisocyanate, naphthylene 1,5-diisocyanate, biphenyl diisocyanate, tolidine diisocyanate or 2,6-tolylene diisocyanate.

It is also possible to use, for example, oligoisocyanates or polyisocyanates which can be prepared from the abovementioned diisocyanates or polyisocyanates or mixtures thereof by linkage via urethane, allophanate, urea, biuret, uretdione, amide, isocyanurate, carbodiimide, uretonimine, oxadiazinetrione or iminooxadiazinedione structures.

Preferred alcohols for urethane formation are linear or branched aliphatic monoalcohols such as methanol, ethanol, propanol, butanol, pentanol, hexanol, heptanol, octanol, isopropanol, isobutanol or 2-ethyl-1-hexanol or araliphatic monoalcohols such as benzyl alcohol or phenylethanol. Particular preference is given to the linear or branched aliphatic monoalcohols and benzyl alcohol.

In the preparation of the high-functionality polyureas, it is necessary to set the ratio of compounds having at least two amine groups which are reactive toward capped NCO groups to the capped isocyanate so that the resulting simplest condensation product (hereinafter referred to as condensation product (A)) contains on average either one capped NCO group and more than one group which is reactive toward the capped NCO group or one group which is reactive toward capped NCO groups and more than one capped NCO group. The simplest structure of the condensation product (A) of a capped diisocyanate or polyisocyanate (X) and a diamine or polyamine (Y) is the arrangement $XY_n$ or $X_nY$, where n is generally from 1 to 6, preferably from 1 to 4, particularly preferably from 1 to 3. The reactive group which results as sole group will hereinafter generally be referred to as "focal group".

If, for example, the ratio in which a capped diisocyanate and a bifunctional amine are reacted in the preparation of a simple condensation product (A) is 1:1, this results in a molecule of the type XY, illustrated by the formula 1.

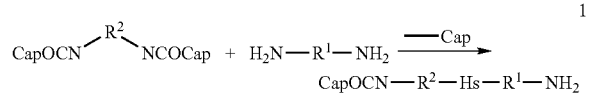

In the preparation of the condensation product (A) of a capped diisocyanate and a trifunctional amine at a reaction ratio of 1:1, the result is a molecule of the type $XY_2$, illustrated by the formula 2. The focal group here is a capped isocyanate group.

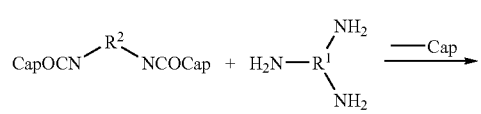

-continued

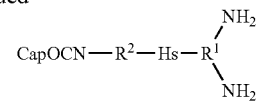

In the preparation of the condensation product (A) of a capped diisocyanate and a tetrafunctional amine at a reaction ratio of likewise 1:1, the result is a molecule of the type $XY_3$, illustrated by the formula 3. The focal group here is a capped isocyanate.

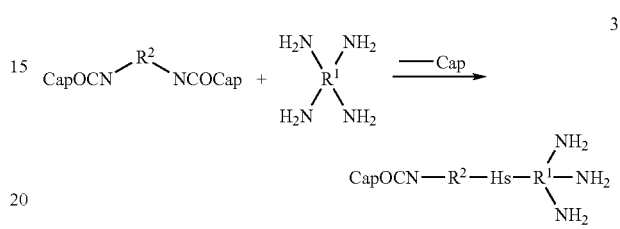

In the formulae 1 to 3, $R^1$ is an aliphatic, aromatic or araliphatic radical which is obtained, for example, by removal of the NCO groups from a diisocyanate or polyisocyanate molecule, $R^2$ is an aliphatic, aromatic or araliphatic radical, Cap is the capping agent and Hs is a urea group.

Furthermore, the condensation product (A) can also be prepared, for example, from a capped diisocyanate and a trifunctional component which is reactive toward the capped diisocyanate, illustrated by the formula 4, with the molar reaction ratio being 2:1. This results in a molecule of the type $X_2Y$, and the focal group here is an amine. In the formula 4, $R^1$ and $R^2$ are as defined for the formulae 1 to 3.

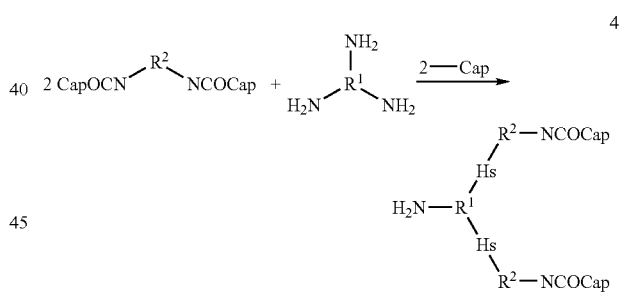

If additional bifunctional compounds, e.g. with two capped isocyanate groups or with two amine groups, are added to the components, this effects extension of the chains, as illustrated, for example, by the formula 5. The result is once again a molecule of type $X_2Y$, and the focal group is a capped isocyanate.

In formula 5, $R^3$ is an organic radical and $R^1$, $R^2$ and Hs are as defined above.

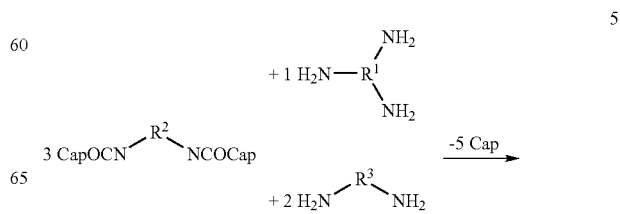

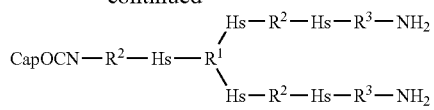

According to the present invention, the simple condensation products (A) described by way of example in the formulae 1–5 preferably react intermolecularly to form high-functionality polycondensation products, hereinafter referred to as polycondensation products (P). The reaction to form the condensation product (A) and to form the polycondensation (P) is usually carried out at from 0 to 250° C., preferably from 60 to 160° C., in bulk or in solution. In the case of a solution polymerization, it is generally possible to use all solvents which are inert toward the respective starting materials. Preference is given to using organic solvents such as decane, dodecane, benzene, toluene, chlorobenzene, xylene, dimethylformamide, dimethylacetamide or solvent naphtha.

In a preferred embodiment, the condensation reaction is carried out in bulk. The capping agent liberated in the reaction with the amine, for example the alcohol used for urethane formation, can be removed from the reaction equilibrium by distillation, if appropriate under reduced pressure, to accelerate the reaction.

In a further preferred embodiment, the alcohol used for urethane formation is used as solvent for the reaction. Here, the urethane component is placed in the reaction vessel as a solution in the alcohol and the amine component is added in the appropriate ratio. When the temperature is increased, the alcohol bound as urethane is displaced by the amine component to form the urea of the present invention. The alcohol component, which is present in excess, also functions as solvent for the ureas formed.

It is also possible to add catalysts or catalyst mixtures to accelerate the reaction. Suitable catalysts are generally compounds which catalyze urethane reactions, for example amines, ammonium compounds and organic compounds aluminum, tin, zinc, titanium, zirconium or bismuth.

Examples of compounds which can be used are diazabicyclooctane (DABCO), diazabicyclononene (DBN), diazabicycloundecene (DBU), imidazoles such as imidazole, 1-methylimidazole, 2-methylimidazole, 1,2-dimethylimidazole, titanium tetrabutoxide, dibutyltin oxide, dibutyltin dilaurate, tin dioctoate, zirconium acetylacetonate or mixtures thereof.

The catalyst is generally added in an amount of from 50 to 10 000 ppm by weight, preferably from 100 to 5000 ppm by weight, based on the amount of the isocyanate used.

Furthermore, it is also possible to control the intermolecular polycondensation reaction both by addition of the appropriate catalyst and by choice of a suitable temperature. In addition, the mean molecular weight of the polymer (P) can be set via the composition of the starting components and via the residence time.

The condensation products (A) and the polycondensation products (P) which have been prepared at elevated temperature are usually stable for a prolonged period at room temperature.

Owing to the nature of the condensation products (A), it is possible for the condensation reaction to result in polycondensation products (P) having different structures which have branches but no crosslinking. Furthermore, the polycondensation products (P) have either one capped isocyanate group as focal group and more than two groups which are reactive toward capped isocyanate groups or else one group which is reactive toward capped isocyanate as focal group and more than two capped isocyanate groups. The number of reaction groups is determined by the nature of the condensation products (A) used and the degree of polycondensation.

For example, a condensation product (A) of the formula 2 can react by triple intermolecular condensation to give two different polycondensation products (P) of the formulae 6 and 7.

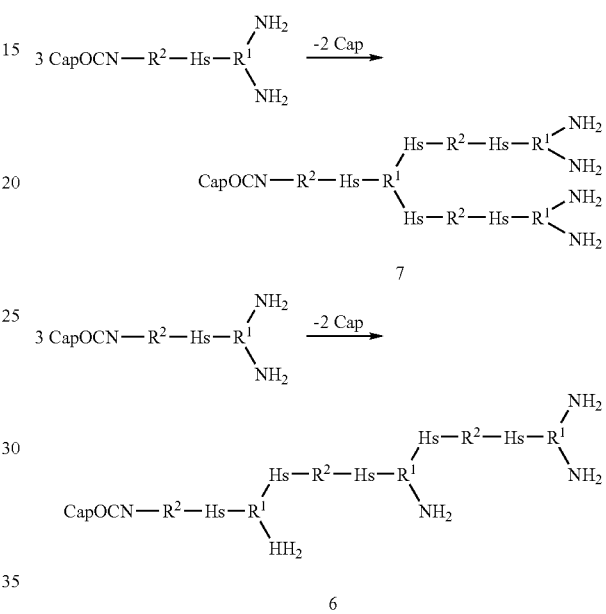

In formulae 6 and 7, $R^1$, $R^2$ and Hs are as defined above.

There are various possible ways of stopping the intermolecular polycondensation reaction. For example, the temperature can be reduced to a range in which the reaction ceases and the product (A) or the polycondensation product (P) is stable on storage.

In a preferred embodiment, the intermolecular reaction of the condensation product (A) to form a polycondensation product (P) is stopped by addition of a product containing groups which are reactive toward the focal group of (P) to the product (P) as soon as a polycondensation product (P) having the desired degree of polycondensation has been obtained. Thus, in the case of a capped NCO group as focal group, it is possible to add, for example a monoamine, diamine or polyamine. In the case of an amine as focal group, it is possible to add, for example, a monourethane, diurethane or polyurethane, a monoisocyanate, diisocyanate or polyisocyanate, an aldehyde, ketone or an acid derivative which is reactive toward amine groups to the product (P).

The preparation of the high-functionality polyureas of the present invention is usually carried out in a pressure range from 2 mbar to 20 bar, preferably at atmospheric pressure, in reactors or reactor cascades which are operated batchwise, semicontinuously or continuously.

As a result of the abovementioned setting of the reaction conditions and, if appropriate, by choice of a suitable solvent, the products prepared according to the present invention can be processed further without further purification after their preparation.

In a further preferred embodiment, the polyureas of the present invention can contain further functional groups in addition to the functional groups obtained by means of the reaction. Functionalization can be carried out during the buildup of the molecular weight or else afterwards, i.e. after the actual polycondensation is complete.

If components which bear further functional groups or functional elements apart from amine or capped isocyanate groups are added before or during the buildup of the molecular weight, a polyurea polymer having randomly distributed functions different from the capped isocyanate or amine groups is obtained.

Such effects can, for example, be achieved by addition of compounds bearing not only amine groups or capped isocyanate groups but also further functional groups or functional elements, e.g. hydroxyl groups, mercapto groups, tertiary amine groups, ether groups, derivatives of carboxylic acids, derivatives of sulfonic acids, derivatives of phosphonic acids, silane groups, siloxane groups, aryl radicals or long-chain alkyl radicals, during the polycondensation. To obtain products modified by means of OH groups, it is possible to use, for example, ethanolamine, N-methylethanolamine, propanolamine, isopropanolamine, 2-(butylamino)ethanol, 2-(cyclohexylamino)ethanol, 2-amino-1-butanol, 2-(2'-aminoethoxy)ethanol or higher alkoxylation products of ammonia, 4-hydroxypiperidine, 1-hydroxyethylpiperazine, diethanolamine, dipropanolamine, diisopropanolamine, tris(hydroxymethyl)aminomethane or tris(hydroxyethyl)aminomethane. For modification with mercapto groups, it is possible to use, for example, cysteamine. Tertiary amino groups can be produced by, for example, incorporation of N-methyldiethylentriamine or N,N-dimethylethylenediamine. Ether groups can be generated by, for example, cocondensation of amine-terminated polyetherols ("Jeffamines"). Acid groups can be obtained by, for example, incorporation of aminocarboxylic acids, aminosulfonic acids or aminophosphonic acids. Silicon groups can be generated by, for example, incorporation of hexamethyldisilazane. Reaction with alkylamines or alkyl isocyanates enables long-chain alkyl radicals to be introduced.

Subsequent functionalization can be achieved by modifying high-functionality polyureas containing amino groups by, for example, addition of molecules containing acid groups, ketone groups or aldehyde groups or molecules containing activated double bonds, for example acrylic double bonds. For example, polyureas containing acid groups can be obtained by reaction with acrylic acid or by reaction with active esters or anhydrides of dicarboxylic acids.

Furthermore, high-functionality polyureas containing amino groups can also be converted into high-functionality polyurea polyols by reaction with alkylene oxides, for example ethylene oxide, propylene oxide or butylene oxide.

The polyureas can be made water-soluble or water-dispersible by salt formation with protic acids or by quaternization of the amine functions with, for example, alkylating reagents such as methyl halides or dialkyl sulfates.

To achieve hydrophobicization, amine-terminated products can be reacted or partially reacted with saturated or unsaturated, long-chain carboxylic acids, their derivatives which are reactive toward amine groups or else with aliphatic isocyanates. Polyureas terminated by capped isocyanate groups can, for example, be reacted with long-chain alkylamines or long-chain aliphatic monoalcohols to produce more hydrophobic products.

High-functionality polyureas containing capped NCO groups can be divided into two categories: high-functionality polyureas containing urethane groups can be modified either "in situ" or else subsequently by, for example, addition of molecules having at least one primary or secondary amine function and additionally other functional groups, e.g. hydroxyl groups, acid groups, ether or ester groups, tertiary amino groups, silane or siloxane groups.

High-functionality polyureas containing capping agents can likewise be modified as described for the polyureas containing urethane groups. However, the ability to remove the capping agent by warming or heating makes it possible for NCO groups to be set free in these molecules so that they can also react easily with, for example, OH-containing molecules.

A great advantage of the process of the present invention is its good economics. Both the reaction to form a condensation product (A) or polycondensation product (P) and the reaction of (A) or (P) to form polyureas having other functional groups or elements can be carried out in one reaction apparatus, which is technically and economically advantageous.

The present invention is illustrated by the following examples.

EXAMPLE 1

Preparation of the Diurethane of Isophorone Diisocyanate (IPDI) and N-butanol 2.1 mol of n-butanol were mixed with dry 2-butanone to form a 50% strength solution, the mixture was heated to 60° C. and 300 ppm (based on the mass of the isocyanate) of dibutyltin dilaurate were added. 1 mol of IPDI was subsequently added over a period of 30 minutes, with the reaction temperature being maintained at 60° C. by means of cooling. After addition of the isocyanate, the mixture was stirred for another 1 hour at 70° C. to complete the urethane reaction. The solvent was subsequently removed on a rotary evaporator at 60° C. under reduced pressure. The product was obtained as a pale yellow oil which was directly processed further.

EXAMPLE 2

Preparation of the Diurethane of Hexamethylene Diisocyanate (HDI) and N-butanol 2.1 mol of n-butanol were mixed with dry 2-butanone to form a 20% strength solution, the mixture was heated to 60° C. and 300 ppm (based on the mass of the isocyanate) of dibutyltin dilaurate were added. 1 mol of HDI was subsequently added over a period of 60 minutes, with the reaction temperature being maintained at 60° C. by means of cooling. After addition of the isocyanate, the mixture was stirred for another 1 hour at 60° C. to complete the urethane reaction. The solvent was subsequently removed on a rotary evaporator at 60° C. under reduced pressure. The product was obtained as a solid which was recrystallized from n-heptane and dried at 40° C. under reduced pressure. The melting point was 92–94° C.

EXAMPLE 3

Preparation of the Diurethane of Tolylene 2,4-diisocyanate (TDI) and N-butanol 2.1 mol of butanol were mixed with dry 2-butanone to form a 50% strength solution, the mixture was heated to 60° C. and 200 ppm (based on the mass of the isocyanate) of dibutyltin dilaurate were added. 1 mol of TDI was subsequently added over a period of 30 minutes, with the reaction temperature being maintained at 60° C. by means of cooling. After addition of the isocyanate, the mixture was stirred for another 1 hour at 60° C. to complete the urethane reaction. The solvent was subsequently removed on a rotary evaporator at 60° C. under reduced pressure and the residue was dissolved in 500 ml of hot n-hexane. The diurethane precipitated as a solid on storage overnight at 3° C. in a refrigerator and was filtered off with suction and dried at 40° C. under reduced pressure. The melting point was 84° C.

EXAMPLES 4–8

Polyureas According to the Present Invention, Preparation in Bulk Using Monoalcohols as Capping Agents for Isocyanate Groups, Molar Ratio of Diurethane:Triamine=1:1

0.5 mol of the urethane of Example 1 or Example 3, if applicable 1000 ppm (based on diurethane) of catalyst and 0.5 mol of triamine as shown in Table 1 were placed in a reaction vessel fitted with stirrer, internal thermometer, nitrogen inlet tube and descending condenser, the temperature was increased to the value indicated in Table 1 and the mixture was allowed to react for the reaction time indicated. Butanol which was liberated was distilled off at 250 mbar. The product mixture was subsequently cooled to room temperature and taken up in dimethylacetamide for GPC analysis.

TABLE 1

Polyureas according to the present invention, prepared in bulk, molar ratio of diurethane:triamine = 1:1

| Example | Isocyanate | Amine | Catalyst | Time/temperature | Product, molecular weight from GPC data (PMMA calibration) | |
|---|---|---|---|---|---|---|
| | | | | | Mw | Mn |
| 4 | IPDI | DETA | DBTL | 2 h at 150° C. | 1110 | 570 |
| 5 | IPDI | DHTA | DBTL | 2 h at 100° C., then 2 h at 140° C. | 14000 | 1790 |
| 6 | TDI | DPTA | DBTL | 2 h at 120° C. | 1960 | 830 |
| 7 | TDI | DHTA | DBTL | 2 h at 120° C. | 5200 | 1480 |
| 8 | TDI | DETA | — | 2 h at 120° C. | 1370 | 720 |

The products 6–8 are obtained as solids after completion of the reaction at 120° C.
IPDI: isophorone diisocyanate
TDI: toluylene 2,4-diisocyanate
DBTL: dibutyltin dilaurate
DETA: diethylenetriamine
DPTA: dipropylenetriamine
DHTA: dihexamethylenetriamine

EXAMPLES 9–12

Polyureas According to the Present Invention, Preparation in Bulk Using Monoalconol as Capping Agent for Isocyanate Groups, Molar Ratio of Diurethane:Triamine=2:1

1 mol of the urethane of Examples 1–3, 1000 ppm (based on diurethane) of dibutyltin dilaurate and 0.5 mol of triamine as shown in Table 1 were placed in a reaction vessel fitted with stirrer, internal thermometer, nitrogen inlet tube and descending condenser, the temperature was increased to the value indicated in Table 1 and the mixture was allowed to react for the reaction time indicated. Butanol which was liberated was distilled off at 250 mbar. The product mixture was subsequently cooled to room temperature and taken up in dimethylacetamide for GPC analysis.

TABLE 2

Polyureas according to the present invention, prepared in bulk, molar ratio of diurethane:triamine = 2:1

| Example | Isocyanate | Amine | Time/temperature | Product, molecular weight from GPC data (PMMA calibration) | |
|---|---|---|---|---|---|
| | | | | Mw | Mn |
| 9 | IPDI | DHTA | 2 h at 120° C., then 2 h at 150° C. | 6100 | 1150 |
| 10 | HDI | DHTA | 2 h at 120° C., then 2 h at 150° C. | 3140 | 1060 |
| 11 | TDI | DETA | 2 h at 120° C., then 0.5 h at 140° C. | 2930 | 1070 |
| 12 | TDI | DHTA | 1 h at 130° C. | 6300 | 1570 |

HDI: 1,6-Hexamethylene diisocyanate

EXAMPLE 13

Polyurea According to the Present Invention, Preparation in Dimethylacetamide as Solvent, Molar Ratio of Diurethane:Triamine=2:1

1 mol of the urethane of Example 3, 1000 ppm (based on diurethane) of dibutyltin dilaurate, 300 ml of dry dimethylacetamide and 0.5 mol of dipropylenetriamine were placed in a reaction vessel fitted with stirrer, internal thermometer and nitrogen inlet tube, the temperature was increased to 120° C. and the mxiture was allowed to react at this temperature for 7 hours. The solution was subsequently cooled to room temperature and analyzed by means of GPC.

Mw=3240 g/mol, Mn=660 g/mol.

EXAMPLES 14–18

Polyureas According to the Present Invention, Preparation in Alcohols as Solvents, Molar Ratio of Isocyanate:Triamine=2:1

10 mol of the anhydrous alcohol shown in Table 3 were placed in a reaction vessel fitted with stirrer, internal thermometer and nitrogen inlet tube while passing dry nitrogen into the vessel, and 1000 ppm (based on isocyanate) of catalyst were added. The solution was subsequently heated to 60° C. and 1 mol of the isocyanate were added at such a rate that the temperature of the reaction mixture did not exceed 70° C. After addition of the isocyanate, the mixture was stirred for another 1 hour at 70° C. 0.5 mol of the amine were subsequently added, the temperature was increased to the value indicated in Table 3 and the mixture was allowed to react at this temperature for the period of time indicated in the table. The solution was then cooled to room temperature and analyzed by means of GPC.

TABLE 3

Polyureas according to the present invention, prepared in alcoholic solution, molar ratio of isocyanate:triamine = 2:1

| Example | Isocyanate | Alcohol | Amine | Catalyst | Time/ temperature | Product, molecular weight from GPC data (PMMA calibration) Mw | Mn |
|---|---|---|---|---|---|---|---|
| 14 | TDI | n-Butanol | DETA | DBTL | 9 h at 130° C. | 4410 | 2500 |
| 15 | TDI | n-Butanol | DHTA | DABCO | 10 h at 130° C. | 8300 | 2700 |
| 16 | TDI | Isobutanol | DETA | DBTL | 10 h at 120° C. | 2600 | 1520 |
| 17 | TDI | 2-Ethyl-hexanol | DETA | DBTL | 7 h at 130° C. | 3740 | 1970 |
| 18 | HI 100 | n-Butanol | D-230 | DBTL | 14 h at 125° C. | 2330 | 1560 |

DABCO: Diazabicyclooctane.
HI 100: Basonat ® HI 100 (BASF AG), polyisocyanurate based on HDI, mean NCO functionality about 3.7, mean molar mass $M_n$ about 610 g/mol.
D-230: Jeffamine ® D-230 (Huntsman Corp.), bifunctional polyetherol terminated by amino groups, mean molar mass $M_n$ about 230 g/mol.

EXAMPLES 19–21

Polyureas According to the Present Invention with Chemical Modification

The amount of anhydrous alcohol or alcohol mixture indicated in Table 4 was placed in a reaction vessel with stirrer, internal thermometer and nitrogen inlet tube while passing dry nitrogen into the vessel, and 1000 ppm (based on isocyanate) of dibutyltin dilaurate were added. The solution was subsequently heated to 60° C. and 1 mol of the isocyanate were added at such a rate that the temperature of the reaction mixture did not exceed 70° C. After addition of the isocyanate, the mixture was stirred for another 1 hour at 70° C. The amount of amine or amine mixture indicated in Table 4 was subsequently added, the temperature was increased to the value indicated in Table 4 and the mixture was allowed to react at this temperature for the period of time indicated in the table. The solution was then cooled to room temperature and analyzed by means of GPC.

In Examples 19 and 20, the polyureas were modified by means of polyetherol segments or OH groups to make them hydrophilic, and in Example 21 they were modified by means of alkyl chains to make them hydrophobic.

TABLE 4

Polyureas according to the present invention with chemical modification

| Example | Isocyanate | Alcohol or alcohol mixture | Amine or amine mixture | Time/ temperature | Product, molecular weight from GPC data (PMMA calibration) Mw | Mn |
|---|---|---|---|---|---|---|
| 19 | TDI | 10 mol of n-butanol + 0.2 mol of Lupranol 2080 | 0.5 mol of DETA | 5 h at 130° C. | 12300 | 6200 |
| 20 | TDI | 10 mol of n-butanol | 0.5 mol of DETA + 0.5 mol of diethanolamine | 20 h at 125° C. | 2330 | 1700 |
| 21 | TDI | 10 mol of n-butanol | 0.45 mol of DETA + 0.5 mol of octylamine | 7 h at 125° C. | 3110 | 1940 |

Lupranol ®2080: Polyoxyethylene-polyoxypropylenetriol (BASF AG), OH number = 48 mg KOH/g, mean molar mass $M_n$ about 3000 g/mol.

EXAMPLES 22–25

Polyureas According to the Present Invention, Preparation from Isocyanates Capped by Means of Capping Agents, Molar Ratio of Isocyanate:Triamine=2:1

0.5 mol of isocyanate and 1000 g of dry dimethylacetamide as shown in Table 5 were placed in a reaction vessel fitted with stirrer, internal thermometer and nitrogen inlet tube while passing dry nitrogen into the vessel, and, if applicable, 1000 ppm of catalyst (based on isocyanate) were added. The solution was subsequently heated to 60° C. and the capping agent, dissolved in 500 g of dimethylacetamide, was added at such a rate that the temperature of the reaction mixture did not exceed 70° C. After addition of the capping agent, the mixture was stirred for another 1 hour at 70° C. and was subsequently cooled to 10° C. in experiments 22 and 23 or to 0° C. in experiments 24 and 25. 0.25 mol of the amine was then added, the temperature was increased to the value indicated in Table 5 and the mixture was allowed to react at this temperature for the period of time indicated in the table. The solution was subsequently cooled to room temperature and analyzed by means of GPC.

TABLE 5

Polyureas according to the present invention, preparation from isocyanates capped by means of capping agents, molar ratio of isocyanate:triamine = 2:1

| Example | Isocyanate | Capping agent | Amine | Catalyst | Time/ temperature | Product, molecular weight from GPC data (PMMA calibration) Mw | Mn |
|---|---|---|---|---|---|---|---|
| 22 | TDI | 0.75 mol of butanone oxime + 0.25 mol of n-butanol | DETA | DBTL | 2 h at 80° C. | 28500 | 6800 |
| 23 | IPDI | 1 mol of 3,5-dimethyl-pyrazole | DETA | DBTL | 2 h at 80° C. and 2 h at 100° C. | 108000 | 8200 |
| 24 | TDI | 1 mol of 3,5-dimethyl-pyrazole | DETA | — | 2 h at 100° C. | 48600 | 12200 |
| 25 | TDI | 0.5 mol of 3,5-dimethyl-pyrazole + 0.5 mol of n-butanol | DETA | DBTL | 2 h at 130° C. | 7500 | 3300 |

2. The process as claimed in claim 1, wherein the capped diisocyanates or polyisocyanates are selected from the group consisting of capped aliphatic, araliphatic and aromatic diisocyanates, polyisocyanates and mixtures thereof.

3. The process as claimed in claim 1, wherein the diisocyanates or polyisocyanates comprise diurethanes or polyurethanes.

4. The process as claimed in claim 1, wherein the capping agents are selected from the group consisting of monoalcohols, phenols, caprolactam, 1 H-imidazole, 2-methylimidazole, 1,2,4-triazole, 3,5-dimethylpyrazole, dialkyl malonates, acetanilide, acetone oxime and butanone oxime.

5. The process as claimed in claim 1, wherein the capping agents are monoalcohols.

6. The process as claimed in claim 1, further comprising after said intermolecularly reacting step,
c) reacting the high-functionality, high branched polyurea with compounds which are reactive toward the functional groups of the polyurea.

7. The process as claimed in claim 1, wherein the reaction is carried out in the presence of a solvent.

8. The process as claimed in claim 7, wherein the solvent comprises the compound which has been used for capping the isocyanate.

I claim:

1. A process for preparing high-functionality, highly branched polyureas, comprising
   a) reacting an at least bifunctional capped diisocyanate or polyisocyanate with at least one at least bifunctional primary and/or secondary amine to eliminate the capping agent and obtain a reaction product,
   b) intermolecularly reacting the reaction product from step a) to form a high-functionality, highly branched polyurea.

9. A high-functionality, highly branched polyurea prepared by the process according to claim 1.

10. A composition which comprises the high-functionality, highly branched polyurea as claimed in claim 9, wherein said composition is in the form of an adhesion promoter, thixotrope, building block for producing paints and varnishes, coatings, adhesives, sealants, castable elastomers or foams.

* * * * *